3,816,483
CARBOXYLIC ACID AMIDE PREPARATION
Achim Werdehausen, Monheim, Herbert Weiss, Cologne-Deutz, and Hartwig Schutt, Dusseldorf-Benrath, Germany, assignors to Henkel & Cie, GmbH, Dusseldorf, Germany
No Drawing. Filed May 24, 1971, Ser. No. 146,300
Claims priority, application Germany, June 2, 1970, P 20 26 832.0
Int. Cl. C07c 103/30
U.S. Cl. 260—404                                10 Claims

ABSTRACT OF THE DISCLOSURE

An improved method for production of carboxylic acid amides comprising reacting ammonia and carboxylic acids of 8 to 24 carbon atoms or an ester thereof in the presence of a reaction-soluble catalyst of a metal from group IVb and Vb of the Periodic Table.

STATE OF THE ART

Several methods for the technical production of amides of fatty acids are already known wherein fatty acids or their esters are reacted with ammonia. The reaction can be arrived at principally in the absence of catalysts. But such a method has the disadvantage that it requires the application of higher pressures, at least 70 excess at., and also considerable reaction times, unless exactly defined conditions are maintained in view of the homogeneity of the mixture reaction. These conditions depend on the working temperature and pressure, that is, there is an optimum temperature for each given pressure above and below which there is a reduction in yield. Since this temperature also depends on the water content of the reaction mixture, it is obvious that the application of such a procedure on a commercial scale would present some problems.

If the reaction of carboxylic acid with ammonia is effected in the presence of catalysts, the application of higher pressure is not necessary, and it is also possible to work over a wider temperature range. As suitable catalysts for this reaction have been described so far: Bleaching earth (Tonsil), fluoridine, frankonite, fuller's earth, silica gel, zeolite, porous oxide and phosphate of the elements aluminum, thorium, tungsten, cerium, praseodymium, neodymium and lanthanum, bauxite, activated charcoal as well as pumice impregnated with phosphoric acid, sulfuric acid, boric acid, and their acid salts. But the use of the above mentioned catalysts has the additional disadvantage that relatively long reaction times are required to achieve a reaction of the carboxylic acid used that is satisfactory for commercial use. Thus reaction times of 48 to 65 hours are mentioned in British Pat. No. 406,191. Moreover, the products obtained in the presence of one of the above mentioned catalysts contain nitriles, though in small quantities (a few percent), but still undesired for further processing or use of the said amides.

OBJECTS OF THE INVENTION

It is an object of the invention to provide a novel process for the preparation of fatty acid amides using catalysts to obtain a commercial process.

It is a further object of the invention to provide a novel process for the preparation of carboxylic acid amides having excellent yields and very low amounts of impurities.

These and other objects and advantages of the invention will become obvious from the following detailed description.

THE INVENTION

The novel process of the invention for the preparation of carboxylic acid amides comprises reacting ammonia with a member of the group consisting of a carboxylic acid of 8 to 24 carbon atoms and an ester thereof in the presence of a reaction-soluble catalyst compound of a metal of groups IVb and Vb of the Periodic Table.

Examples of the compounds of the above mentioned metals which are suitable as catalysts are (a) The esters of the corresponding ortho-metallic acids, particularly with primary and secondary aliphatic alcohols, which contain preferably 1–18 C-atoms, for example, methanol, ethanol, n- and iso-propanol, n- and iso-butanol, 2-ethyl-hexanol-1, lauryl alcohol stearyl alcohol, synthetic alcohol mixtures of oxo- and Ziegler processes, ether- and polyether alcohols, obtained by alkoxylation reactions of substances with active H-atoms;

(b) Complex compounds with 1,3-diketones, such as 3-methylpentanedione(2,4), 3- ethyl pentanedione-(2,4), heptanedione-(2,4), decanedione-(2,4) and particularly pentanedione-(2,4) (acetyl acetone);

(c) Halogen compounds of the metal in their higher valence stage, particularly chlorine compounds; and (d) Acyl compounds as they can be produced by reacting the halides with metal salts of carboxylic acids in known manner, for example, according to the method of U.S. Pats. 2,132,999; 2,489,651; 2,621,193 and 2,621,195 and which are present partly in polymeric form which contains the groupings similar to the gels formed by intermolecular dehydration from the ortho-metallic acids. These compounds are generally called metal polyhydroxy acylates.

Preferably the titanium-, zirconium and tantalum compounds of the above mentioned type are used, for example, tetra-iso-propyl titanate, tetra-n-butyl titanate, tetra-iso-propyl zirconate, tetra-n-butyl zirconate, tetraisobutyl zirconate, tetra-2-ethylhexyl titanate, tetrastearyl titanate, mixed esters of titanic acid with short- and long-chained alcohols, e.g. $C_3$ and $C_{18}$ alcohols, titanium polyhydroxy acylates of the formula

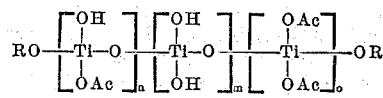

wherein R and R' are hydrogen or acyl of an organic carboxylic acid of 1 to 18 carbon atoms and Ac is acyl of an organic carboxylic acid, preferably stearoyl and at least one of $n$, $m$ and $o$ is an integral number while the remainder may be zero or an integral number, tetra-n-propyl zirconate, tetraisobutyl zirconate, tetra-n-butyl zirconate, titanium acetyl acetonate, zirconium acetyl acetonate, titanium tetrachloride, zirconium tetrachloride, tantalum pentachloride.

Of the above mentioned catalysts, the complex compounds of the 1,3 diketones, primarily of acetyl acetone, are particularly advantageous because of their resistance to hydrolysis, especially in process of the invention where no or only incomplete intermediate drying of the circulated ammonia takes place.

The catalysts are added to the reaction mixture in quantities of 0.1 to 10, preferably 0.5 to 5% by weight, relative to the beginning carboxylic acid or carboxylic acid-ester.

The reaction is carried out preferably in a temperature range of 100–250° C. A temperature above 250° C. enhances a more rapid reaction course but it is not recommended because of the danger of a secondary reaction, that is, dehydration with formation of nitriles. A temperature below the indicated limit will still permit a reaction, but requires unjustifiably long reaction times. Of particular advantage is a temperature range between 120 and 200° C.

Predrying of the ammonia gas used for the reaction is not necessary. But it is advisable if the ammonia is to be recycled to liberate it of the water from the reaction mixture formed during the reaction before returning it to the reaction mixture.

The introduction of the ammonia gas into the carboxylic acid or carboxylic acid ester mixture is effected best at the bottom of the reaction vessel to ensure prolonged contact of the ammonia with the carboxylic acid or acid-ester to be reacted. Suitable reaction vessel are particularly vertical reaction towers or pipes whose dimensions may be adapted to the available equipment and to the size of the charges.

But as reaction vessels, reactors with different dimensions can also be used provided a sufficiently fine dispersion of the supplied gas in the reaction mixture is ensured by a corresponding constructional design of the ammonia supply—for example intensive stirrer in front of the ammonia feed pipe.

The ammonia gas is preferably introduced into the reaction mixture in an amount which should not be less than 20 l./kg. of starting material an hour. The optimum amount and velocity of flow is determined to a great extent by the available equipment and can also be adapted to the reaction course. For example, at the start of the reaction, relatively large amounts and high velocities of flow can be used which are reduced slowly with decreasing ammonia consumption of the reaction mixture.

When working in the range of high velocities of flow of the ammonia gas, it may be of advantage to preheat the ammonia gas to the selected working temperature, but at least to a temperature which corresponds to the melting point of the carboxylic acid used, provided free carboxylic acids are used as substances to be reacted. Principally, it is advisable to preheat the ammonia gas in the case of large charges.

The reaction can be carried out under normal pressure. In the method of the invention can be used as starting material straight-chained or branched saturated and unsaturated carboxylic acids with 8 to 24 carbon atoms, for example, lauric acid, myristic acid, palmitic acid, stearic acid, arachic acid, behenic acid, lignoreric acid, oleic acid, erucic acid, linoleic acid, linolenic acid, arachidonic acid, ricinoleic acid, ricinenic acid, capric acid, caprylic acid, straight-chained and branched carboxylic acids of synthetic origin, for example, carboxylic acids obtained by oxidation of paraffins in the presence of boric acid or by oxo-reaction, cyclic carboxylic acids, such as naphthenic acid, resinic acid, or polymeric carboxylic acids, as they can be obtained by polymerization of unsaturated carboxylic acids. These carboxylic acids can be used alone or in mixture with each other as starting materials. Other carboxylic acid mixtures that can be used as starting materials can be produced in known manner by saponification of natural triglycride mixtures, for example, coconut oil, cotton seed oil, linseed oil, olive oil, palm oil, palm kernel oil, soya oil, tall oil, lard, beef tallow and fish oil.

Other starting materials to be used in the process are the esters of the above mentioned carboxylic acids with monovalent aliphatic alcohols. Preferred here are the esters of alcohols with 1 to 4 carbon atoms, since these esters, particularly the methyl esters, are available as re-esterification mixtures of natural triglyceride mixtures on a large commercial scale. If these esters or their homolog mixtures are used, the carboxylic acid amides produced in the method are N-alkylated partly by further reaction with the alcohol liberated during the reaction. Since the N-alkylated carboxylic acid amides are particularly valuable as foam stabilizers, the mixtures of substituted and unsubstituted amides resulting from the use of esters are especially interesting as additives to detergents and cleaners.

The reaction times after which a satisfactory degree of reaction of the carboxylic acid or ester used can be obtained with the method are substantially shorter than the reaction times which are required for a comparable degree of reaction when using the catalysts known from British Pat. No. 406,691. Moreover, higher degrees of reaction can be achieved with the method, absolutely speaking, than is the case even if the reaction times are further extended in the method of the said British patent.

The nitrile content of the products obtained in the method according to the invention is very low and can be reduced to less than 0.5% under corresponding test conditions. This fact is of particular importance for the use of carboxylic acid amides in the plastic sector, for example, as lubricants and antiblocking agents where the presence of nitrile is particularly undesired.

The success of the method of the invention was even less foreseeable as it was known from U.S. Pat. 2,993,926 that some of the catalysts to be used in the invention, namely esters of the acids of metals of the groups IVb of the periodic system, are used in the production of carboxylic nitriles from the same starting materials as in the present case. In a single-stage process, yields of up to 98% nitriles were obtained and it was therefore to be expected that these catalysts would not be suitable in a process to prepare carboxylic acid amides, and which are to have in addition a very low nitrile content.

In the following examples there are described several preferred embodiments to illustrate the invention. However, it should be understood that the invention is not intended to be limited to the specific embodiments.

The amide and nitrile contents of the products indicated in the following examples were determined by IR-spectroscopy.

The Lovibond color values were measured in solution (1 part by weight carboxylic amide in 5 parts by weight chloroform) using a 1″ cuvette at 40° C.

EXAMPLE I 500 g. of a commercial fatty acid fraction consisting substantially of stearic acid (characteristics: acid number 195 to 199, saponification number 195 to 200, iodine number 2, M.P.=66 to 68° C.) were charged into a round-bottom flask provided with a stirrer and mixed with 5 g. (1% by weight) of tetraisopropyl titanate. After the mixture was heated to 165° C., ammonia was introduced into the reaction mixture under intensive stirring at a rate of 100 l./h. After two hours, the rate of flow of the ammonia was reduced to 75 l./h. The product, after a total reaction time of 7 hours, contained 98.4% amide, 0.8% nitrile, and had an acid number of 1.53 (corresponding to a content of about 0.85% unreacted carboxylic acid). The Lovibond color values of the product were: yellow: 4.3; red: 1.1; and blue: 0.

EXAMPLES 2-5

The carboxylic acid mentioned in example 1 was reacted under similar test conditions by varying the amounts of tetraisopropyl titanate and the reaction temperature.

| Ex. No. | Percent by weight of catalyst | Temp. (°C.) | Reaction time in hours | Acid No. | Percent nitrile | Percent amide |
|---|---|---|---|---|---|---|
| 2 | 0.5 | 165 | 10 | 2.78 | 0.8 | 97.8 |
| 3 | 2.0 | 165 | 5 | 2.99 | 0.7 | 97.7 |
| 4 | 1.0 | 175 | 6 | 3.73 | 0.6 | 97.5 |
| 5 | 2.0 | 175 | 5 | 3.38 | 0.7 | 97.6 |

EXAMPLES 7-15

Example 6 was repeated by varying the amounts of catalyst and the reaction temperature.

| Example No. | Percent of catalyst | Temp. (°C.) | Reaction time in hours | Acid No. | Percent nitrile | Percent amide |
|---|---|---|---|---|---|---|
| 7 | 1.0 | 150 | 11 | 3.82 | 0.2 | 97.9 |
| 8 | 0.2 | 165 | 12 | 3.61 | 1.0 | 97.1 |
| 9 | 0.5 | 165 | 10 | 5.01 | 0.6 | 96.9 |
| 10 | 2.0 | 165 | 7 | 3.16 | 0.2 | 98.2 |
| 11 | 0.2 | 175 | 9 | 2.89 | 1.2 | 97.3 |
| 12 | 0.5 | 175 | 9 | 3.52 | 1.3 | 97.0 |
| 13 | 1.0 | 175 | 7 | 4.15 | 0.4 | 97.5 |
| 14 | 2.0 | 175 | 6 | 3.23 | 0.4 | 98.0 |
| 15 | 0.2 | 185 | 7 | 4.66 | 1.5 | 96.1 |

EXAMPLES 16-26

The carboxylic acid described in example 1 was reacted with ammonia in the presence of 1% by weight of the catalysts listed in the following table at 165° C. in a procedure similar to example 1.

EXAMPLES 16-26

| Example No. | Catalyst | Reaction time in hours | Acid No. | Percent nitrile | Percent amide | Lovibond color | | |
|---|---|---|---|---|---|---|---|---|
| | | | | | | Yellow | Red | Blue |
| 16 | Tetra-isobutyl zirconate | 9 | 1.79 | 2.0 | 97.09 | 3.8 | 1.0 | 0 |
| 17 | Tetra-n-butyl zirconate | 9 | 3.45 | 0.5 | 97.75 | 2.5 | 0.9 | 0 |
| 18 | Titanium polyhydroxy stearate [1] | 14 | 2.11 | 0.9 | 98.0 | 4.0 | 1.0 | 0 |
| 19 | Titanium acetyl acetonate | 9 | 3.75 | 0.8 | 97.3 | 4.0 | 1.0 | 0 |
| 20 | $C_3$ and $C_{18}$ tetraalkyl dititanate [2] | 8 | 2.24 | 1.1 | 97.8 | 4.0 | 0.8 | 0 |
| 21 | Tetra-2-ethylhexyl titanate | 11 | 2.21 | 1.5 | 97.4 | 4.0 | 1.0 | 0 |
| 22 | Tetrastearyl titanate | 14 | 4.98 | 0.9 | 96.6 | 3.0 | 1.0 | 0 |
| 23 | Tetra-n-butyl titanate | 12 | 3.80 | 1.3 | 96.8 | | | |
| 24 | Zirconium acetyl acetonate | 10 | 3.68 | 0.6 | 97.6 | 6 | 4.2 | 1.2 |
| 25 | Zirconium tetrachloride | 11 | 4.87 | 0.5 | 96.5 | | | |
| 26 | Tantalum pentachloride | 8 | 3.93 | 2.2 | 95.8 | 7 | 2.2 | 0 |

[1] Acyl compound with Ac=stearoyl: trade name Tyzor TLF 2005.
[2] Mixed ester of titanic acid with a 1:1 $C_3$-$C_{18}$ alcohol mixture.

EXAMPLE 6

The carboxylic acid described in example 1 was reacted with ammonia in a similar manner in the presence of 5 g. (1% by weight) of tetra-n-propyl zirconate at 165° C. for 9 hours. The product contained 98.1% amide, 0.3% nitrile and had an acid number of 3.23. The Lovibond color values were: yellow: 5.1; red: 1.0; and blue: 0.

EXAMPLES 27-37

The carboxylic acids mentioned below were reacted in the presence of 1% by weight of tetra-n-propyl zirconate at a reaction temperature of 165° C. with ammonia in a procedure similar to Example 1.

| Example No. | Carboxylic acid | Reaction time in hours | Acid No. | Percent nitrile | Percent amide | Lovibond color | | |
|---|---|---|---|---|---|---|---|---|
| | | | | | | Yellow | Red | Blue |
| 27 | Oleic acid | 9 | 2.17 | 0.4 | 98.6 | 5.1 | 1.5 | 0 |
| 28 | Erucic acid | 9 | 1.55 | 0.5 | 98.6 | 1.4 | 4.2 | 0 |
| 29 | Linoleic acid [1] | 9 | 3.22 | 0.7 | 97.7 | | | |
| 30 | Ricienenic acid | 9 | 3.68 | 0.5 | 97.6 | | | |
| 31 | Palmitic acid | 7 | 3.52 | 0.4 | 98.0 | 3.0 | 1.1 | 0 |
| 32 | Myristic acid | 9 | 1.75 | 0.4 | 98.9 | 2.9 | 1.0 | 0 |
| 33 | Lauric acid | 8 | 2.91 | 0.2 | 98.8 | 1.6 | 0.6 | 0 |
| 34 | Capric acid | 8 | 3.00 | 0.2 | 98.9 | 0.4 | 0.2 | 0 |
| 35 | Caprylic acid | 8 | 5.95 | 0.1 | 98.4 | 2.0 | 0.5 | 0 |
| 36 | Ricinoleic acid | 9 | 3.57 | 0.4 | [2]70-75 | 10.0 | 2.2 | 0 |
| 37 | $C_{16}$-$C_{18}$ carboxylic acid [3] | 9 | 2.63 | 0.4 | 98.3 | 0.5 | 0 | 0.1 |

[1] 70%.  [2] Ab. 25% esterification.  [3] 30% $C_{16}$, 70% $C_{18}$ Carboxylic acid.

EXAMPLES 38-47

The carboxylic acids mentioned below were reacted in the presence of 1% by weight of tetra-iso-propyl titanate with ammonia at 165° C. in a procedure similar to example 1.

| Example No. | Catalyst | Reaction time in hours | Acid No. | Percent nitrile | Percent amide | Lovibond color | | |
|---|---|---|---|---|---|---|---|---|
| | | | | | | Yellow | Red | Blue |
| 38 | Oleic acid | 8 | 1.39 | 1.8 | 97.5 | 5.0 | 1.0 | 0 |
| 39 | Erucic acid | 9 | 1.10 | 1.9 | 97.4 | 1.5 | 5.0 | 1.0 |
| 40 | Linoleic acid [1] | 10 | 4.02 | 0.4 | 97.6 | 9.0 | 1.0 | 0 |
| 41 | Ricinenic acid | 7 | 4.70 | 0.6 | 97.0 | | | |
| 42 | Palmitic acid | 8 | 2.21 | 1.0 | 98.0 | 3.0 | 0.9 | 0 |
| 43 | Myristic acid | 8.5 | 3.79 | 1.0 | 97.5 | 2.2 | 0.9 | 0 |
| 44 | Lauric acid | 8 | 4.22 | 0.3 | 98.2 | 1.5 | 0.6 | 0 |
| 45 | Capric acid | 10 | 3.86 | 1.0 | 97.8 | 1.0 | 0.2 | 0 |
| 46 | Caprylic acid | 10 | 5.82 | 0.3 | 98.2 | 1.0 | 0.5 | 0 |
| 47 | Ricinoleic acid | 7 | 3.87 | 0.5 | [2]70-75 | | | |

[1] 70%.  [2] Ab. 24% esterification.

EXAMPLE 48

Comparison tests (a) The technical stearic acid described in example 1 was reacted in the presence of boric acid in the amounts indicated below at different reaction temperatures in a procedure similar to example 1.

| Percent by weight catalyst | Temp. (° C.) | Reaction time in hours | Acid No. | Percent nitrile | Percent amide | Lovibond color Yellow | Red | Blue |
|---|---|---|---|---|---|---|---|---|
| 0.5 | 150 | 24 | 3.2 | 1.1 | 97.3 | | | |
| 1.0 | 150 | 22 | 3.7 | 3.2 | 94.9 | | | |
| 2.0 | 150 | 19 | 3.0 | 3.3 | 93.4 | | | |
| 0.5 | 165 | 18 | 4.1 | 2.5 | 95.4 | | | |
| 1.0 | 165 | 18 | 3.8 | 2.4 | 95.6 | 6.0 | 1.2 | 0 |
| 2.0 | 165 | 17 | 3.0 | 2.2 | 96.3 | | | |
| 0.5 | 175 | 12 | 3.5 | 2.5 | 95.7 | | | |
| 1.0 | 175 | 12 | 3.1 | 2.1 | 96.3 | | | |
| 0.5 | 185 | 10 | 3.2 | 4.4 | 94.0 | | | |

(b) The carboxylic acids mentioned below were reacted in the presence of 1% of boric acid at a reaction temperature of 165° C. with ammonia in a procedure similar to example 1.

| Acid | Reaction time in hours | Acid No | Percent nitrile | Percent amide | Lovibond color Yellow | Red | Blue |
|---|---|---|---|---|---|---|---|
| $C_{16}$-$C_{18}$ carboxylic acid mixture [1] | 18 | 4.20 | 1.9 | 96.0 | 1.4 | 0.8 | 0 |
| Oleic acid | 16 | 4.83 | 1.7 | 96.0 | 5.0 | 1.1 | 0 |
| Erucic acid | 15 | 3.99 | 1.8 | 95.8 | 1.0 | 7.1 | 0 |
| Linoleic acid [2] | 16 | 3.82 | 3.6 | 94.5 | 8.9 | 0.9 | 0 |
| Ricinenic acid | 13 | 3.99 | 1.5 | 96.5 | 6.0 | 1.2 | 0 |
| Palmitic acid | 15 | 4.02 | 2.0 | 97.1 | 2.9 | 0.9 | 0 |
| Myristic acid | 15 | <3.6 | 2.2 | 97.2 | 3.1 | 1.0 | 0 |
| Lauric acid | 15 | 3.93 | 2.7 | 95.9 | 4.0 | 1.0 | 0 |
| Capric acid | 13 | 3.97 | 1.0 | 97.8 | 1.6 | 0.7 | 0 |
| Caprylic acid | 13 | 4.06 | 0.3 | 98.7 | 3.2 | 0.9 | 0 |
| Ricinoleic acid | 33 | 6.37 | 4.3 | [3] 70-75 | 10.0 | 2.1 | 0 |

[1] 30% $C_{16}$, 70% $C_{18}$ carboxylic acid. [2] 70%. [3] Ab. 26% esterification.

The advantages that can be achieved with the invention consist primarily in that a method for the production of carboxylic acid amides has been developed which permits the production of these substances with short reaction times and without complicated procedures in excellent quality. It should be particularly stressed that the products have an extremely low nitrile content with a high degree of reaction of the carboxylic acid or -ester used. Another advantage is that the method can be carried out in a pressure-free method so that the equipment costs are reduced, and that a special preliminary treatment of the starting materials and a sharp separation of the ammonia gas used is not necessary. The production of the carboxylic amides is thus made more economical, and the method of the invention presents a considerable industrial progress.

The products obtained with this method can be used as lubricants and anti-blocking agents in the plastic industry as intermediate products for organic syntheses and as foam influencing additives in detergents and cleansers.

Various modifications of the process of the invention may be made without departing from the spirit or scope thereof and it is to be understood that the invention is not intended to be limited only as defined in the appended claims.

We claim:

1. A process for the preparation of carboxylic acid amides comprising reacting ammonia with a member of the group consisting of a carboxylic acid of 8 to 24 carbon atoms and an aliphatic ester thereof in the presence of a reaction-soluble catalyst compound of a metal selected from the group consisting of a tantalum halide or a zirconium or titanium compound selected from the group consisting of ortho acid esters with alcohols, complexes with 1,3-diketones, halogen compounds and acyl compounds.

2. The process of claim 1 wherein the catalyst compound is a metal complex with a 1,3-diketone.

3. The process of claim 2 wherein the 1,3-diketone is acetyl acetone.

4. The process of claim 1 wherein the amount of catalyst is 0.1 to 10% by weight based on the acid compound.

5. The process of claim 4 wherein the amount is 0.5 to 5.0%.

6. The process of claim 1 wherein the reaction temperature is 100 to 250° C.

7. The process of claim 6 wherein the temperature is 120 to 200° C.

8. The process of claim 1 wherein the reaction is effected at atmospheric pressure.

9. The process of claim 1 wherein the ammonia is added at the rate of 20 liters per hour per kilogram of acid compound.

10. A process for the preparation of carboxylic acid amides comprising reacting at 100 to 250° C. ammonia with an acid member of the group consisting of a carboxylic acid of 8 to 24 carbon atoms and esters thereof with aliphatic alcohols of 1 to 4 carbon atoms at normal pressures in the presence of 0.1 to 10% by weight based on the said compound, of a metal catalyst compound of a metal selected from the group consisting of a tantalum halide or a zirconium or titanium compound selected from the group consisting of ortho acid esters with an alcohol, halides, complexes with aliphatic 1,3-diketones and polyhydroxy acylates.

References Cited

UNITED STATES PATENTS

| | | | |
|---|---|---|---|
| 3,324,179 | 6/1967 | Scholz et al. | 260—561 |
| 3,590,057 | 6/1971 | Suzuki et al. | 260—404 |
| 1,991,956 | 2/1935 | Ralston | 260—404 |
| 2,013,108 | 9/1935 | Reppe et al. | 260—404 |
| 2,794,043 | 5/1957 | Janse et al. | 260—404 |

LEWIS GOTTS, Primary Examiner

E. G. LOVE, Assistant Examiner

U.S. Cl. X.R.

260—557 R, 561 R